United States Patent

[11] 3,631,670

| [72] | Inventor | Takis P. Vassilakis<br>Paris, France |
| --- | --- | --- |
| [21] | Appl. No. | 862,244 |
| [22] | Filed | Sept. 30, 1969 |
| [45] | Patented | Jan. 4, 1972 |
| [73] | Assignee | Treadwell Corporation |

[54] DEVICE TO EXTRACT POWER FROM THE OSCILLATION OF THE SEA
4 Claims, 3 Drawing Figs.

[52] U.S. Cl................................................. 60/22,
74/88, 74/126
[51] Int. Cl................................................. F03c 5/00
[50] Field of Search............................................ 60/22;
137/423; 74/88, 126

[56] References Cited
UNITED STATES PATENTS

| 674,002 | 5/1901 | Gehre............................ | 60/22 X |
| --- | --- | --- | --- |
| 892,567 | 7/1908 | Thrasher et al.............. | 60/22 |
| 1,823,190 | 9/1931 | Christie......................... | 60/22 |

Primary Examiner—Martin P. Schwadron
Assistant Examiner—Allen M. Ostrager
Attorneys—Harry C. Bierman, Jordan B. Bierman and Bierman & Bierman

ABSTRACT: The device consists of two floats having different natural oscillation frequencies. The floats are linked by a rocking rod. The floats are set into a bobbing motion relative to one another by oscillations on the surface of a body of water. A mechanism is provided for translating the rocking motion of the rocking rod into a rotary motion of a fly wheel. The fly wheel can be utilized to drive a generator.

PATENTED JAN 4 1972  3,631,670
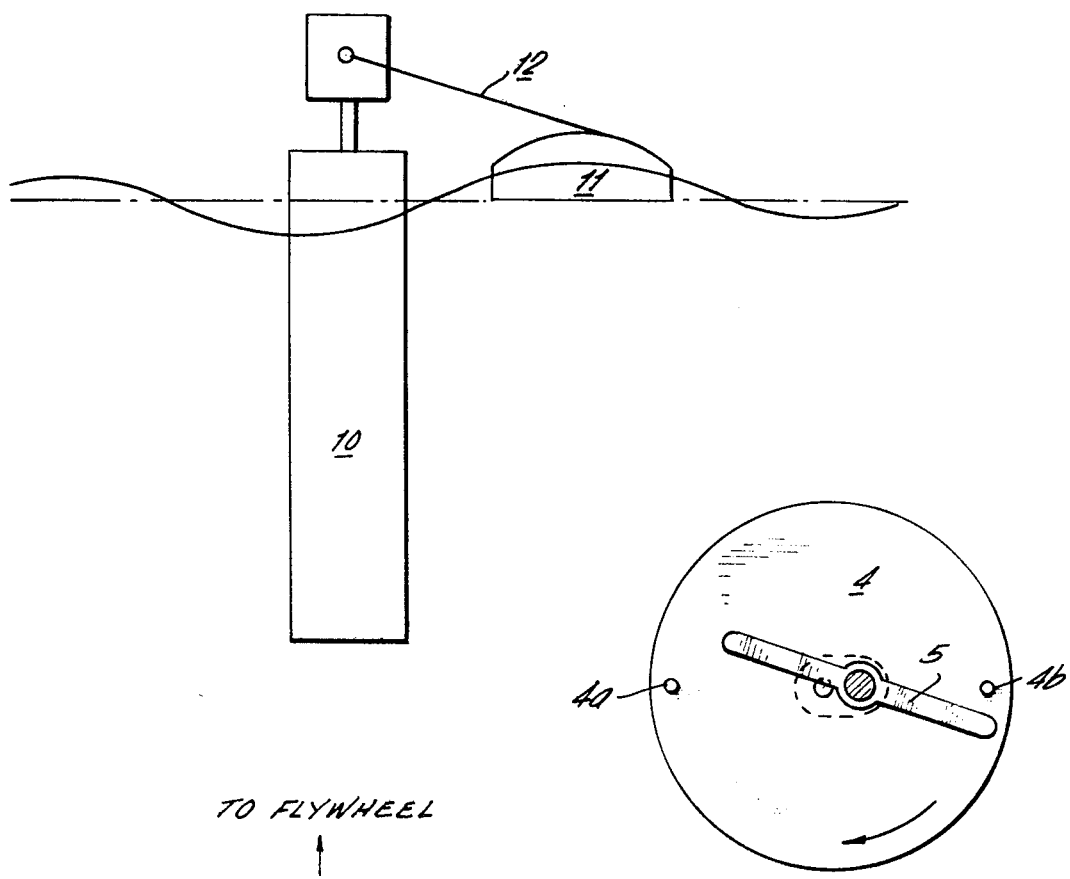
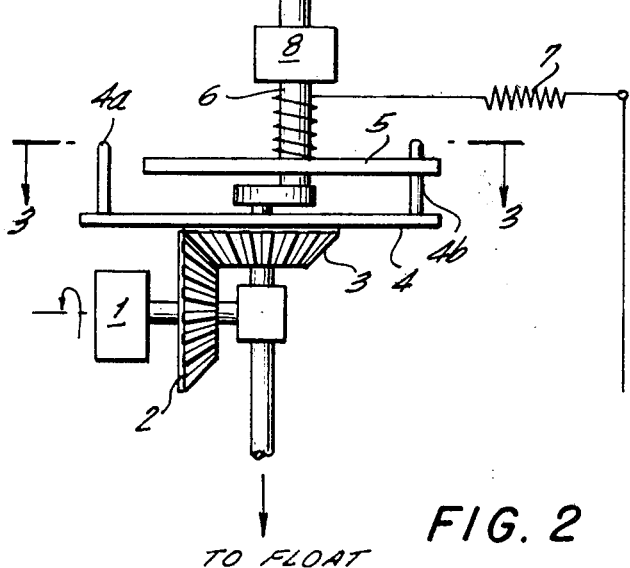
INVENTOR
TAKIS P. VASSILAKIS
BY
Bierman & Bierman
ATTORNEYS

DEVICE TO EXTRACT POWER FROM THE OSCILLATION OF THE SEA

The present invention relates to a device for extracting power from surface oscillations occurring in a body of water, as for example, waves on the surface of a sea or lake. The device translates the surface oscillations into rotary motion. This motion can be utilized to drive a fly wheel. The power thus obtained can be used for various purposes. It can be employed to drive a generator, for charging the batteries of marine buoys; it can be used to power emergency communication equipment in life rafts.

The device of the present invention will now be explained with reference to the following drawings which illustrate preferred embodiments thereof. It should be understood that these drawings are offered only for the purpose of illustrating the invention and not for the purpose of limiting same. In the drawings:

FIG. 1 is a schematic view of a preferred embodiment of the device of the present invention;

FIG. 2 is a plan view of a mechanism for translating the up-and-down motion of the floats into a rotary motion, and FIG. 3 is a sectional view taken along the line 3—3 of FIG. 2 looking in the direction of the arrows. The device will now be explained in detail with reference to the drawings.

The operation of the device is based on the motion of two floating bodies. The oscillation frequency of one body differs from that of the other body due to a difference in the masses and/ or cross-sectional areas (at the water level) of said bodies. With proper design, the second float 11, which has a larger cross section as shown in FIG. 1, will follow the motion of a surface oscillation in the body of the water in which said float is immersed. The first float 10, having as shown in said FIG. 1 a smaller cross-sectional area relative to said second float, will be set into an oscillatory motion which, by design, has a frequency slower than that of a typical surface oscillation. As a result, the two floats will bob up and down in the water at different frequencies, the motion of the floats being for the most part out of phase relative to one another. This imparts a rocking motion to a rocking rod 12 which links floats 10 and 11.

With an appropriate mechanism, as for example, the mechanism shown in FIG. 2, the rocking motion of the rocking rod 12 can be translated into a steady or quasisteady rotary motion of, for example, a fly wheel. The fly wheel in turn can be linked to an electric power generator or other device. The power level attained thereby obviously will depend upon the wave or oscillation amplitude, wavelength, and upon the size of the device. A power of the order of 10 watts may readily be generated with steady waves of modest amplitude using a device having modest size, as for example, a device which measures only a few feet. In general, the oscillations may be either continuous ones, as for example, the oscillations of the surface of he sea, or of a large body of water, or intermittent wave trains such as are generated by the passage of boats or ships through a channel or a confined waterway.

A mechanism for translating the rocking motion of the rocker arm 12 into a quasisteady rotary motion is shown in FIG. 2. This mechanism operates as follows:

The rocking arm 12 is attached to a first friction ratchet 1. As the rocking arm 12 rocks, the first friction ratchet 1 turns a first bevel gear 2 in a counterclockwise direction only. This intermittent rotation is translated to a second bevel gear 3 and to a disc 4 attached to it. Disc 4 as shown in FIGS. 2 and 3 is fitted with two pegs 4a and 4b. As the disc 4 rotates in a clockwise direction one of pegs 4a and 4b acts on an arm 5. Arm 5 is mounted on an axis which is offset from the axis of the disc 4. The peg which acts on the arm 5 pushes arm 5 around with it in a clockwise direction. Arm 5 is attached to shaft 6. Shaft 6 rotates with arm 5. The rotation of shaft 6 serves to wind up a spring 7. When a rotation of about one-half revolution has occurred, the peg 4b will, as a result of the eccentricity of the mounting, slip past the end of arm 5. Spring 7 will then pull arm 5 and with its shaft 6 rapidly back by one-half revolution until arm 5 comes to rest against the other peg. This imparts, by means of a second friction ratchet 8, a rotary impulse to axle 9. Axle 9 is connected to a fly wheel (not shown). Friction ratchet 8 allows the fly wheel to rotate freely in a counterclockwise direction while the arm 5 is again engaged by the peg and the cycle is repeated.

It should be noted that the device of the present invention is entirely free-floating and self-contained. Further, said device does not have to be attached to the bottom or to a rigid platform. The mechanism which translates the bobbing motion of the floats into rotational movement can be contained in a waterproof compartment to prevent corrosion, thus minimizing required maintenance.

I claim:

1. A device for converting wave energy into mechanical energy comprising a first float; a second float; said first float having a greater weight relative to said second float or a smaller cross-sectional area relative to said second float whereby said floats when immersed in a liquid having surface oscillations move in a substantially up and down direction at different frequencies; a rocking rod connecting said floats; means attached to said rod for translating the up-and-down movement of the floats to rotational movement, said means comprising a first friction ratchet rotatable in only one direction; a first bevel gear mounted for rotation with said first friction ratchet; a second bevel gear engaged with said first bevel gear; a disc having a first axis, said disc being mounted for rotation with said second bevel gear, said disc having at least one pin attached thereto; an arm substantially parallel to said disc rotatably mounted on a second axis, said second axis being substantially parallel to said first axis and offset therefrom, said pin contacting said arm at one end thereof upon rotation of said disc and rotating said arm with said disc; spring means urging said arm in a direction opposite to the direction of rotation of the arm.

2. A device as described in claim 1, wherein said second axis constitutes a shaft rotatable with said arm, further including a second friction ratchet rotatable only in the direction of the movement of the disc.

3. A device as described in claim 1 wherein said means for translating is mounted on the first float.

4. A device as described in claim 1 wherein said means for translating is mounted on the second float.

* * * * *